United States Patent
Maluf et al.

(10) Patent No.: US 7,698,274 B1
(45) Date of Patent: Apr. 13, 2010

(54) SELECTIVE ACCESS AND EDITING IN A DATABASE

(75) Inventors: David A. Maluf, Mountain View, CA (US); Yuri O. Gawdiak, Silver Spring, MD (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 907 days.

(21) Appl. No.: 10/956,524

(22) Filed: Sep. 22, 2004

(51) Int. Cl.
G06F 7/00 (2006.01)
G06F 12/00 (2006.01)

(52) U.S. Cl. .................................. 707/9; 707/200
(58) Field of Classification Search .............. 707/201, 707/9, 10, 8, 200
See application file for complete search history.

(56) References Cited

U.S. PATENT DOCUMENTS

| | | | | |
|---|---|---|---|---|
| 5,276,901 A | * | 1/1994 | Howell et al. | 707/9 |
| 5,317,730 A | * | 5/1994 | Moore et al. | 707/100 |
| 5,493,728 A | * | 2/1996 | Solton et al. | 711/113 |
| 5,544,360 A | * | 8/1996 | Lewak et al. | 707/1 |
| 5,644,768 A | * | 7/1997 | Periwal et al. | 718/102 |
| 5,737,536 A | * | 4/1998 | Herrmann et al. | 709/229 |
| 5,933,825 A | * | 8/1999 | McClaughry et al. | 707/8 |
| 5,941,947 A | * | 8/1999 | Brown et al. | 709/225 |
| 6,047,288 A | * | 4/2000 | Kurosawa et al. | 707/9 |
| 6,088,702 A | * | 7/2000 | Plantz et al. | 707/103 R |
| 6,240,414 B1 | * | 5/2001 | Beizer et al. | 707/8 |
| 6,578,037 B1 | * | 6/2003 | Wong et al. | 707/10 |
| 6,581,075 B1 | * | 6/2003 | Guturu et al. | 707/201 |
| 6,754,658 B1 | * | 6/2004 | Matsuno | 707/9 |
| 6,938,031 B1 | * | 8/2005 | Zoltan et al. | 707/1 |
| 7,146,367 B2 | * | 12/2006 | Shutt | 707/9 |
| 2006/0004733 A1 | * | 1/2006 | Zoltan et al. | 707/3 |

* cited by examiner

*Primary Examiner*—John E Breene
*Assistant Examiner*—Joshua Bullock
(74) *Attorney, Agent, or Firm*—John F. Schipper; Robert M. Padilla

(57) ABSTRACT

Method and system for providing selective access to different portions of a database by different subgroups of database users. Where N users are involved, up to $2^N - 1$ distinguishable access subgroups in a group space can be formed, where no two access subgroups have the same members. Two or more members of a given access subgroup can edit, substantially simultaneously, a document accessible to each member.

4 Claims, 3 Drawing Sheets

SELECTIVE ACCESS AND EDITING IN A DATABASE

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to selective access to, and substantially simultaneous editing of, different portions of a database.

BACKGROUND OF THE INVENTION

A complex program having many tasks and sub-tasks, many phases and many workers will often have an associated database with many users, each of which has a limited "need to know" that does not extend to all information in the database. An example is a database that includes information on individual personnel, including confidential evaluations and reports on supervisory interviews. A group of users having access to information in a particular portion of a database may need to edit one or more documents or other collections of information to restate the original information more conveniently or accurately.

What is needed is a database system that provides selective access to different portions of the database for different groups of users, where the different groups may have partly overlapping access group memberships. Preferably, the system should allow substantially simultaneous editing of one or more documents or other collections of information by one, two or all access group members. Preferably, the system should be flexible and should allow for change in definition of the portions of the database accessible by a specified access group.

SUMMARY OF THE INVENTION

These needs are met by the invention, which provides selective access to as many as $2^N-1$ (or $2^N$) mutually exclusive portions of a database by different subgroups of N users. One or more members of an access subgroup can edit a document or other information collection (referred to collectively as a "document" herein for convenience), to which the members have access, substantially simultaneously. Optionally, members of a given access subgroup can be assigned different numerical priorities so that, as between first and second users in the subgroup, (proposed) editing of a document by the first user will subsequently be reviewed, and declined or partly entered or wholly entered, by the second user.

DESCRIPTION OF BEST MODES OF THE INVENTION

Figure 1:
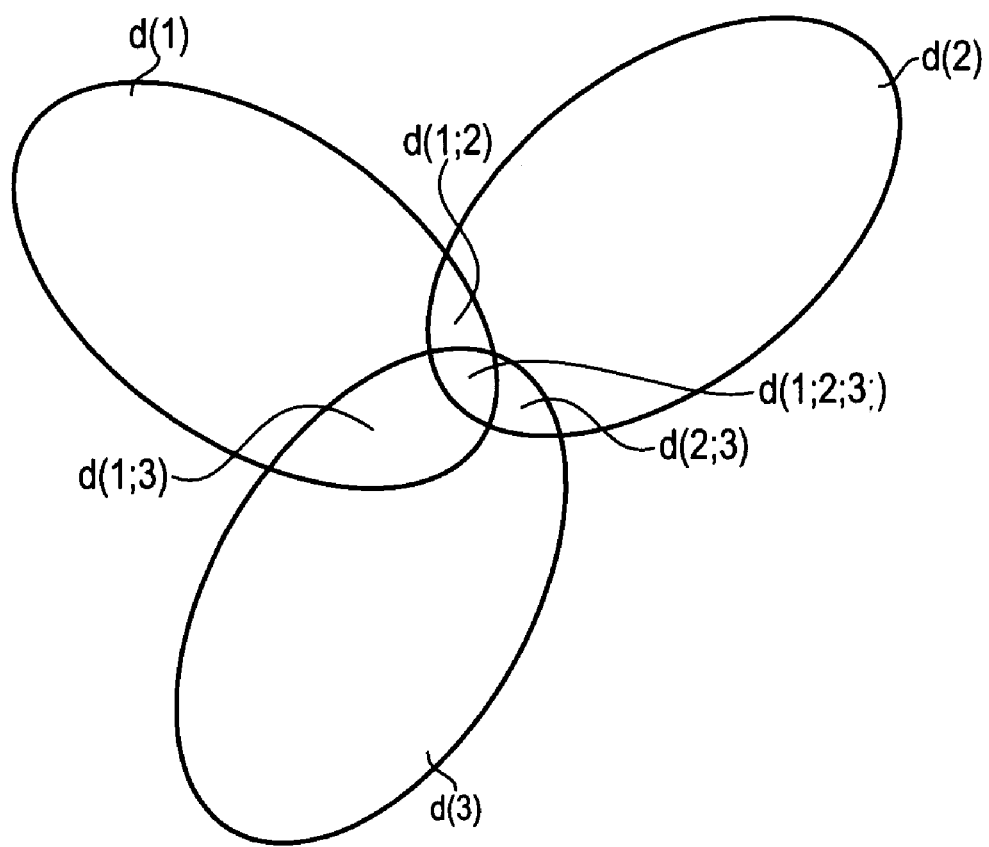
FIG. 1 is a Venn diagram illustrating selective access to different portions of a database by three users.

Consider a database that receives information from one or more information sources and that is queried by a plurality of users, as illustrated in FIG. 1 for N=3 users, The database permits selective access of a given user to different portions of the database, depending upon the user's identity and access permissions. The database includes three portions d(n1) that are accessible only to user n1 (=1, 2, 3), three portions d(n1; n2) that are accessible jointly to user n1 and to user n2 (n1≠n2), but not to any other user; and a portion d(n1;n2;n3) that is accessible to all users. User access to different portions of the XDB database is initially determined when a user account is set up. User access can be subsequently changed according to the circumstances.

More generally, where N users are present (N≧2), the database includes N portions d(n1) that are accessible only to user n1, B(N;2) portions d(n1; n2) that are accessible only to users n1 and n2 (n1≠n2), and more generally B(N;k) portions d(n1; n2; . . . ; nk) portions that are jointly accessible only to users n1, n2, . . . , nk with no two of n1, n2, . . . , nk being equal), with k=2, . . . , N, where $$B(P;Q)=P!/\{Q!(P-Q)!\} \qquad (1)$$

is the number of distinct combinations of P distinguishable objects, taken Q at a time. Optionally, one or more of the different database portions is empty. Optionally, the entire database is accessible by at least one user. Each of the $2^N-1$ portions of the database discussed above has no overlap with any other of these portions. Optionally, another portion of the database is not accessible by any of these users but may be accessible by another entity not in the user group.

Provision of selective access to the database allows restriction of user access to the information contained in different portions of this database based upon "need to know" or another suitable basis. Thus, users 1 and 2 may be permitted access to and use of information for classes 1 and 2, respectively, of portions of documents and other information collections (referred to collectively herein as "documents"), where classes 1 and 2 are either mutually exclusive or are partly overlapping and partly non-overlapping. This approach may be used where, for example, user 1 is preparing or is modifying, with authorization, one or more documents in class 1 so that access to (a portion of) the class 1 material is temporarily or permanently restricted. This approach may be used where to restrict access to sensitive, such as personality assessment of a worker in connection with the human model.

After all information in a document has been identified as being accessible to the different users, through allocation of accessibility to the different portions, such as d(n1;n2;n3;n4), one or more group spaces can be implemented, allowing each member of a group to edit the document and to examine what changes have been made or are being made to the document by one or more other members of the group. For example, all members of the group Gr{n1;n2;n3;n4} have access to the portion d(n1;n2;n3;n4) of the collection, and each member of this group can independently edit this portion of the document.

Assume that users n1, n2 and n3 are separately editing this portion of the collection. An active user, for example, n2, immediately sees the results of that user's own editing activities but does not yet see the results of the editing activities of each of the other active users (here, n1 and n3).

In one embodiment, a first copy of each user's own edited copy (referred to herein as a "self-change" copy) of the accessible portion d(n1;n2;n3;n4) of the document is saved as that user enters that user's changes. Optionally, a second copy of each user's edited self-change copy is periodically "frozen," at a sequence of specifiable times (e.g., at times a specified temporal distance apart, such as once every 5-30 sec), and this "frozen" copy is made available for viewing by any other active member or inactive member of the group Gr(n1;n2;n3; n4). Optionally, to the extent the changes in any two or more "frozen" copies are not inconsistent with each other, an omnibus edited copy is prepared, upon user demand, that incorporates all the changes in these not-inconsistent (non-self-change) copies generated by other users.

Changes in one or more of the non-self-change copies that are inconsistent with changes in the self-change copy, or with changes in each other, are flagged or otherwise called to the attention of a user (e.g., n2). An inconsistent change is presented to, and can be accepted or declined by, the user presently viewing the proposed change(s). Optionally, the users in a given group, such as Gr(n1;n2;n3;n4) are assigned priorities within the group (e.g., n3<n4<n2 <n1), and changes made by the lowest priority user are first considered (and accepted or declined) by the second lowest priority user, then by the third lowest priority user, etc., until the changes are presented to (and accepted or declined by) the highest priority user in that group. Optionally, if a user in a group is not actively editing the accessible portion of the information collection, that user is bypassed and is assumed to accept all changes proffered by the next-lower priority active user.

In a limited context, editing changes to the accessible collection, proposed at substantially the same time by two or more active users in a group, can be incorporated, using a change tracking system that operates serially on these edits as these edits are "entered" by the active users. It is preferable in this approach to assign a mutually exclusive sequence of times $\{t_{n;k}\}_k$ (n−1, ..., N), with $t_{n1;k1} \neq t_{n2;k2}$, to each user in the group and to enter all permissible changes made by an active user (e.g., user n1) only at the sequence of times corresponding to that user (e.g. $\{t_{n1;k}\}_k$ for user n1). In this approach, the changes entered by the last user are automatically entered and are not presented to other users in the group for consideration.

Optionally, an omnibus edited copy may prepared and displayed by the system for all users in the group at a first specified time interval, such as once every 30-120 sec or at the end of a second specified time interval (e.g., of length 60-300 sec) during which no proposed changes are entered in the document. Optionally, an omnibus edited copy is prepared and displayed by the system for all users in the group only upon receipt of a request by a user in the group.

The system thus allows: (1) formation of up to $2^N-1$ group spaces, with each group space having a different mix of members or users; (2) preparation of different edited copies of the accessible portion of the document by one or more users in that group space and instant display, to each active user of that active user's previous edits; (3) display, at specifiable times, of edits made by other users in that group space; and (4) to the extent that changes made by any subgroup of users (including the whole group) are not inconsistent with each other, preparation and display of an omnibus edited copy that reconciles and incorporates in the accessible portion of the document all edits by all active users, upon user demand.

Figure 2:
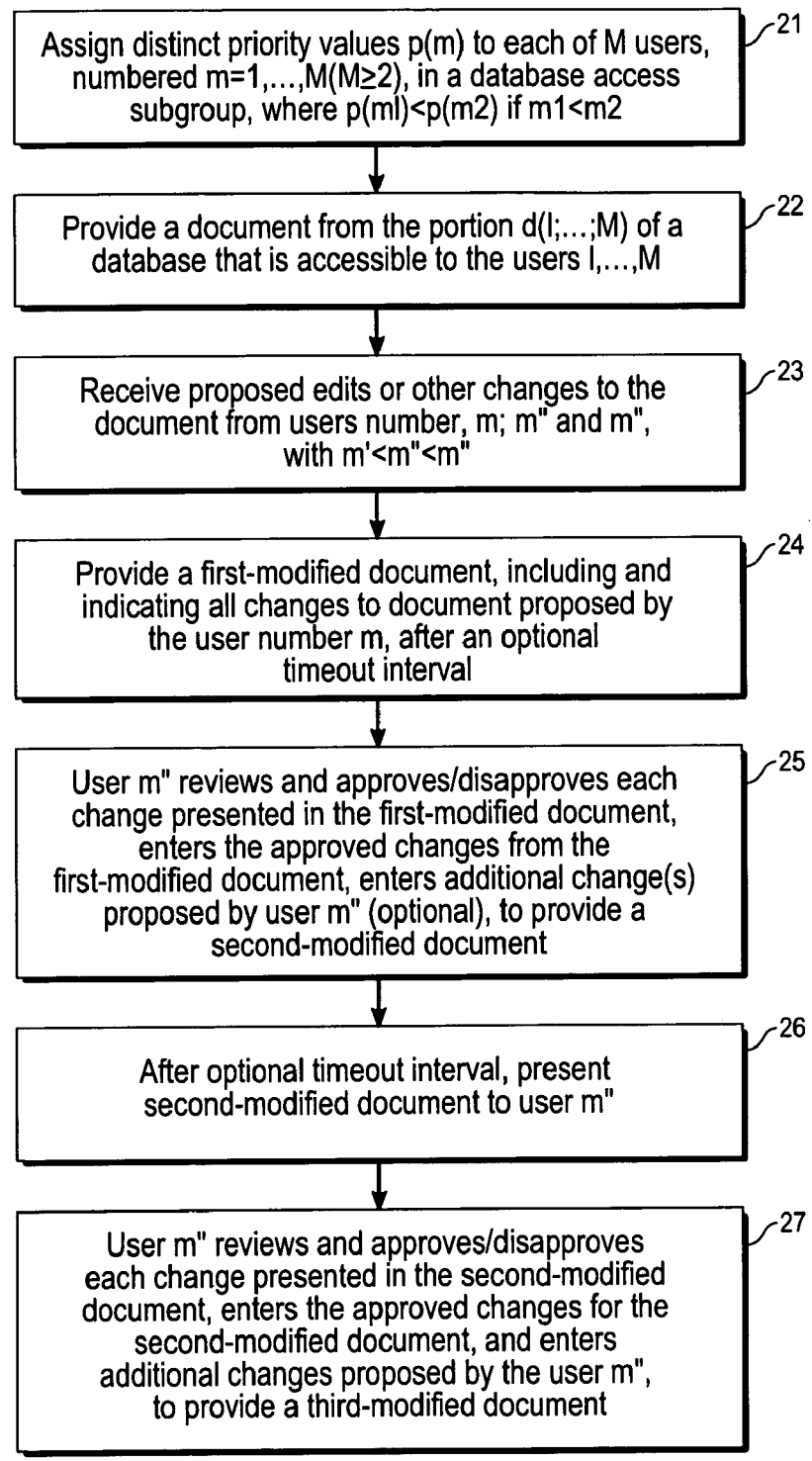
FIGS. 2 and 3 are flow charts illustrating procedures for substantially simultaneous editing of a document according to different embodiments.

FIG. 2 is a flow chart of a procedure for using assigned priorities to perform substantially simultaneous editing of a document. In step 21, a numerical priority p(m) (or its equivalent) is assigned to each of a subgroup of M users, numbered m=1, ..., M, of a database, where each priority value p(m) is distinct from each of the other priority values. For example, for M=4, the four priority values might be {−3.14, 0.5, 2, √17}. For definiteness, it is assumed that p(m1)<p(m2) if m1<m2, for users m1 and m2 (m1, m2=1, ..., M). In step 22, a document from a portion d(1; ...; M) of a database, to which each of the M users has access, is provided for editing by this access subgroup. In step 23, two or three users, number m' and m" and m''', with m'<m"<m''', enter proposed edits or other changes for the document. In step 24, a first-modified document, containing and indicating the document changes proposed by user m', is prepared and presented to user m", after a timeout interval (optional) determined by a time at which (1) user m' presents the proposed changes (timeout 1) or (2) a first specified time interval elapses after user m' began presenting the proposed changes (timeout 2) or (3) a second specified time interval elapses after user m' has presented the most recent proposed change (timeout 3).

In step 25, user m" reviews and approves/disapproves each of the changes proposed in the first-modified document, enters the changes from the first-modified document that are approved by user m", and optionally enters additional changes proposed by user m", to provide a second-modified document that includes the changes proposed by user m" and the surviving changes proposed by user m'. In step 26, after a timeout interval (optional) analogous to the timeout interval in step 25, the second-modified document is presented to user m'''.

In step 27, user m''' reviews and approves/disapproves each of the changes proposed in the second-modified document; enters the changes from the second-modified document that are approved by user m'''; and optionally enters additional changes proposed by user m''', to provide a third-modified document. This process can be continued until each user with proposed edits for the document has had an opportunity to present, and have considered, that user's proposed edits to the document. This approach requires assignment of a distinct priority value to each user in the subgroup and has the advantage that no ambiguity exists as to whether a given change is ultimately accepted.

Figure 3:
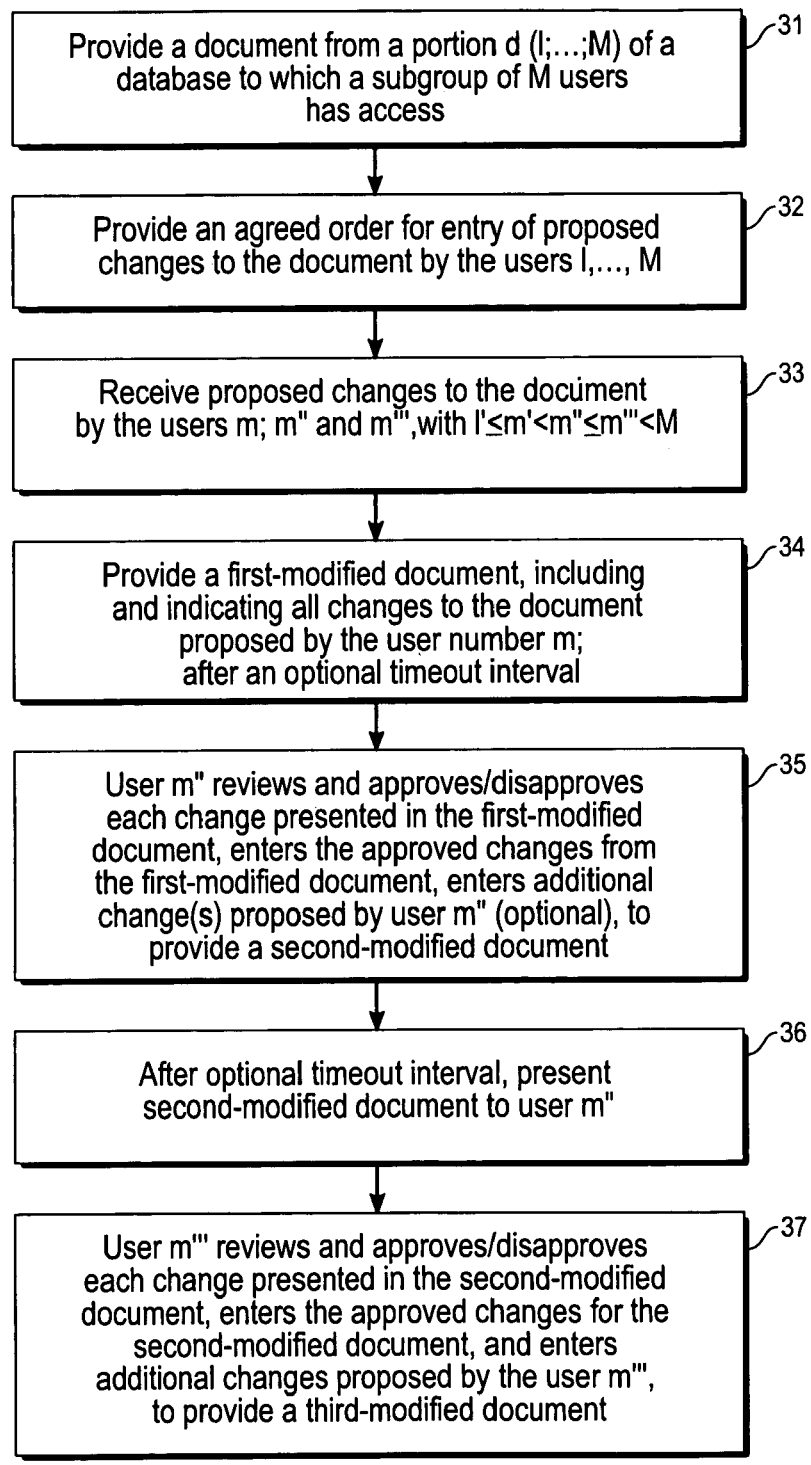

FIG. 3 is a flow chart of an alternative procedure for entering (or ignoring) edits presented substantially simultaneously for a given document, using a change tracking system. In step 31, a document from a portion d(1; ...; M) of a database, to which each of a subgroup of M users, numbered m=1 ..., M, have access (M≧2), is provided for editing by this access subgroup. In step 32, an agreed order o(m) for entry of proposed changes to the document by each of the users m is provided. Without loss of generality, this order of entry may be taken to be {1, ..., M, 1, ..., M, 1, ...}. In step 33, each of two or three users, number m', m" and m''', presents proposed changes for the document, with 1≦m'<m"<m'''≦M.

In step 34, a first-modified document, containing and indicating the document changes proposed by user m', is prepared and presented to user m" by the change tracking system, after a timeout interval determined by a time at which (1) user m' presents the proposed changes (timeout 1) or (2) a first specified time interval elapses after user m' began presenting the proposed changes (timeout 2) or (3) a second specified time interval elapses after user m'has presented the most recent proposed change (timeout 3). Proposed changes in the document may be indicated on a visual display screen by use of a different character color and/or use of a different font size and/or use of a different font than is used for display of the unchanged portions of the (first-modified) document.

In step 35, user m" reviews and approves/disapproves each of the changes proposed in the first-modified document, enters the changes from the first-modified document that are approved by user m", and optionally enters additional changes proposed by user m", to provide a second-modified document that includes the changes proposed by user m" and the surviving changes proposed by user m'. In step 36, after a timeout interval analogous to the timeout interval in step 34, the second-modified document is presented to user m'". In step 37, user m" approves/disapproves each surviving change presented by user m", enters the approved changes from the second-modified document, and presents (further) changes proposed by user m'", to provide a third-modified document. After another timeout interval, the third-modified document can be returned to user m' or to user m" or to another user within the access subgroup to present further changes, if desired.

Optionally, where one or more users have brought up a copy of a given document within an accessible portion d(1; . . . ; M) of a database, a portion of a display screen of each such user will indicate that one, two or more such users are presently editing the document. Optionally, the user's screen will identify, by name or associated symbol, which user or users are presently engaged in such editing. Where two or more users are presently engaged in editing of a given document, each of these users has the option of (1) entering his or her edits in a passive mode initially and subsequently merging these (proposed) edits with (proposed) edits for the document received from the other users and (2) entering that user's edits in an active mode in which the (proposed) edits are accepted or declined substantially as these edits are proposed, by reference to changes proposed by the other users and to the associated editing priorities.

Where the users are engaged in a brainstorming or equivalent session, in which items are added but are not deleted or edited or analyzed at the time such items are entered on a list, a user in that group space optionally can receive a copy of the list off-line and can assign the items to suitable categories as the items are received (referred to herein as "off-line categorization"). This feature allows one or more users in that group space to categorize the items proffered in such a session as the session proceeds. This off-line categorization can be subsequently used as a basis for analysis or other processing of items on the list(s).

A group space for GrSpf{1, . . . , M} includes users number 1, . . . , M, the set of documents and other collections of information in the database to which each of these users has access, and a system that allows one, two or more of the (active) users to enter proposed changes in a document substantially simultaneously. Members in two different group spaces will have access to different collections of documents from a given database; and no two different group spaces will have precisely the same set of members. A collection of group spaces may be formed for any database for which changes in a document can be proposed and subsequently entered.

What is claimed is:

1. A method for managing a database that is accessible by at least three users, the method comprising:

providing a document or other collection of information (collectively referred to as a "document") for a database;

for at least one subgroup of M users of the document (M≧3), numbered m=1, . . . , M, providing a portion of the database that is accessible only by members of the subgroup of M users;

assigning a priority value p(m) for access to the document by each user number m, where no two users in the subgroup of M users have the same priority value;

disallowing access to the collection of information by any user not a member of the subgroup of M users;

receiving, from users number m', m" and m'" in the subgroup of M users with p(m')<p(m")<p(m'"), a first change in the document proposed by the user m' and a second change in the document proposed by the user m";

permitting the user m' to enter the first change in the document, to provide a first-modified document;

after a first selected timeout interval is completed, determined with reference to at least one of (i) a time the user m' first began entering the first proposed change in the document and (ii) a time the user m' last made an entry that contributes to the first change in the document, terminating further changes in the first-modified document, as modified by the user m', and displaying the first-modified document, to the user m", where the first change in the document is displayed in at least one of (a) a first color, (b) a first font and (c) a first font size that is distinguishable from at least a portion of the document that is not modified by the first change;

visually displaying and permitting the user m" to review and to accept, or to not accept, the first change proposed by the user m' in the first-modified document, to provide a first-modified-and-reviewed document;

permitting the user m" to enter the second change in the first modified-and-reviewed document, to provide a second-modified document;

after a second selected timeout interval is completed, determined with reference to at least one of (i) a time the user m" first began entering the second proposed change in the document and (ii) a time the user m" last made an entry that contributes to the second change in the document, terminating further changes in the second-modified document, as modified by the user m", and displaying the second-modified document to the user m'", where the second change in the document is displayed in at least one of (a) a second color, (b) a second font and (c) a second font size that is distinguishable from at least a portion of the document that is not modified in the first modified-and-reviewed document and is not modified by the second change; and visually displaying and permitting the user m'" to review and to accept, or to not accept, the changes proposed in the second-modified-and-reviewed document.

2. The method of claim 1, further comprising:

permitting said user m'" to enter a third change in said second modified-and-reviewed document, to provide a third-modified document; and after a third selected timeout interval is completed, determined with reference to at least one of (i) a time said user m'" first began entering the third proposed change in said document and (ii) a time said user m'" last made an entry that contributes to the third change in said document, terminating further changes in the third-modified document, as modified by said user m'", and displaying the third-modified document, with the third change proposed by said user m'" incorporated, where the third change in said document is displayed in at least one of (a) a third color, (b) a third font and (c) a third font size that is distinguishable from at least a portion of said document that is not modified by said first change, is distinguishable from at least a portion of said document that is not modified in said second modified-and-reviewed document and is not modified by the third change.

3. The method of claim 2, further comprising:

after said third timeout interval is completed, and a user m*, who is at least one of said user m' and said user m", has a fourth change to propose in said document, permitting the user m* to enter the fourth change in the document, to provide a fourth-modified document;

after a fourth selected timeout interval is completed, determined with reference to at least one of (i) a time the user m* first began entering the at least fourth proposed change in said document and (ii) a time the user m* last made an entry that contributes to the fourth change in said document, terminating further changes in the fourth-modified document, as modified by the user m*, and displaying the fourth-modified document, with the fourth change in the document, to said user m''', where the fourth change in said document is displayed in at least one of (a) a fourth color, (b) a fourth font and (c) a fourth font size that is distinguishable from at least a portion of said document that is not modified in said third modified-and-reviewed document, and is not modified by the fourth change; and visually displaying and permitting said user m''' to review and to accept, or to not accept, the fourth change proposed by the user m* in the fourth-modified document, to provide a fourth-modified-and-reviewed document.

4. The method of claim 1, further comprising: after a no-activity timeout interval is completed, during which no additional proposed change in said document is received, displaying said document, with all of said changes in said document that have been accepted, for at least a selected display time interval.

* * * * *